Dec. 8, 1925.
I. A. WEAVER
1,564,654
ALIGNMENT GAUGE
Filed Sept. 24, 1923
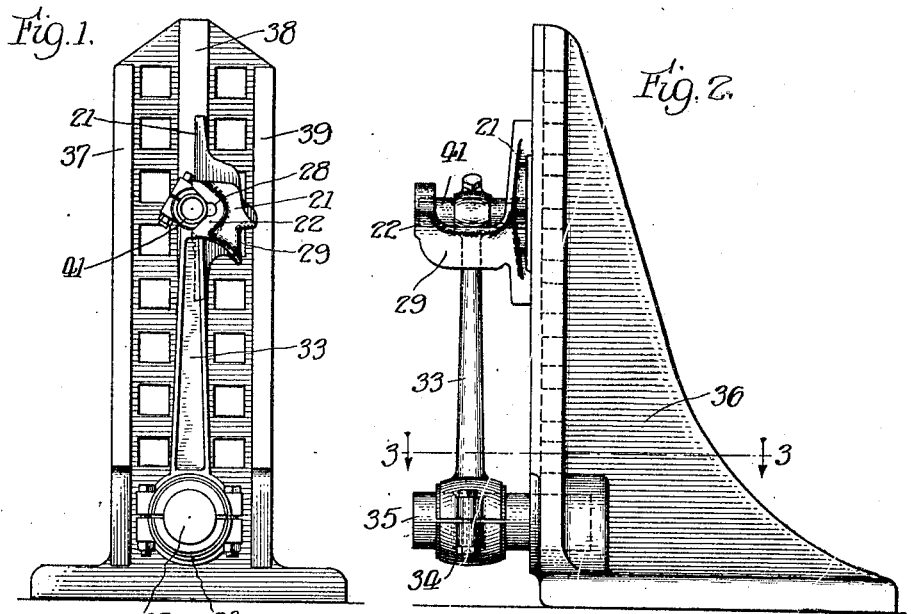
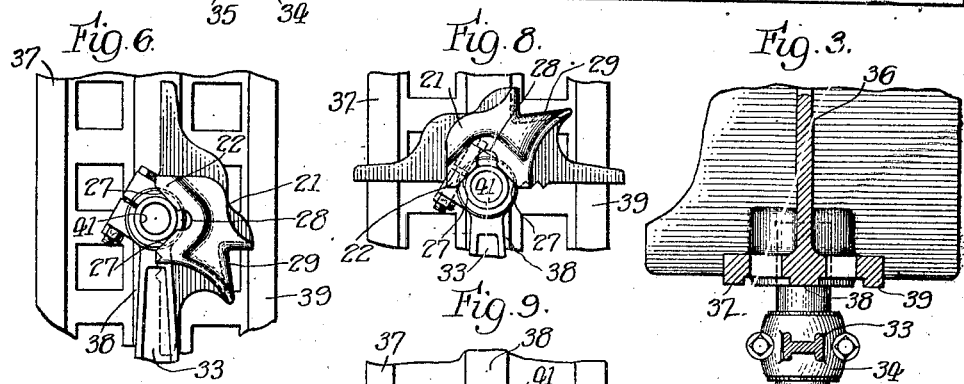
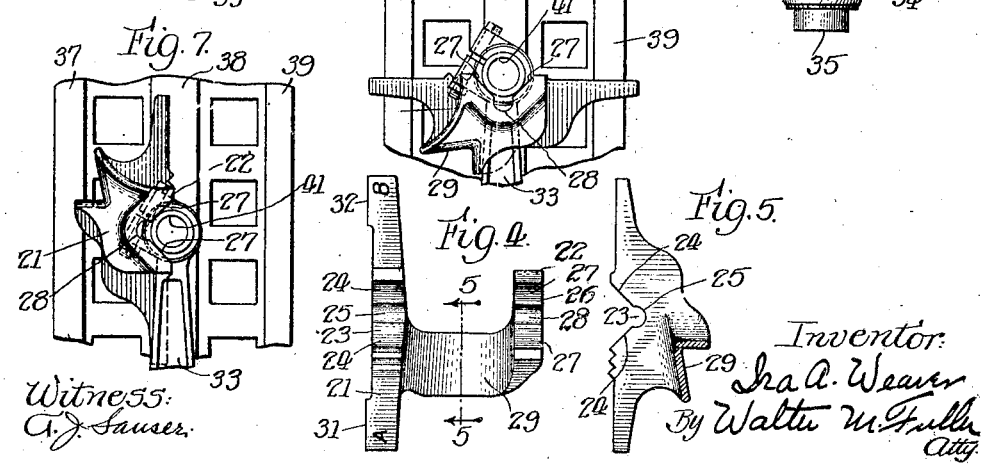
Witness:
G. J. Sauser.
Inventor:
Ira A. Weaver
By Walter M. Fuller
Atty.

Patented Dec. 8, 1925.

1,564,654

UNITED STATES PATENT OFFICE.

IRA A. WEAVER, OF SPRINGFIELD, ILLINOIS, ASSIGNOR TO WEAVER MANUFACTURING COMPANY, OF SPRINGFIELD, ILLINOIS, A CORPORATION OF ILLINOIS.

ALIGNMENT GAUGE.

Application filed September 24, 1923. Serial No. 664,483.

*To all whom it may concern:*

Be it known that I, IRA A. WEAVER, a citizen of the United States, residing at Springfield, in the county of Sangamon and State of Illinois, have invented certain new and useful Improvements in Alignment Gauges, of which the following is a specification.

My invention relates to alignment gauges and similar precision appliances, such as are commonly used in connection with internal combustion engine connecting-rods, wrist-pins, pistons, etc. to check up on the accuracy of relative relations and positions of associated or separate mechanical elements.

One object of the invention is the provision of a device of this kind which is simple in structure, which is economical to manufacture, which permits the attainment of reliable results by its employment, and which enables the user to verify its own accuracy.

Inasmuch as an appliance or article of this kind is subject to wear and the metal of which it is made is possibly liable to changes in shape owing to seasoning of the casting, and inasmuch as such appliances are exposed to more or less abuse, it is apparent that an instrument of this kind should be so made that its precision and exactness may be readily established at all times.

The novel appliance consists preferably of a single casting of peculiar and especial shape which is designed and intended to be employed with a plane surface of any other appropriate body with which it cooperates.

To enable those skilled in this art to have a full and complete understanding of the invention and its various structural and functional advantages, in the accompanying drawing forming a part of this specification, and throughout the several views of which like reference characters have been employed for the same parts of the mechanism, I have illustrated a desirable and preferred embodiment of the invention.

In this drawing:

Figure 1 shows the novel gauge applied in one position to the wrist or piston pin of a connecting-rod of an internal combustion motor, the instrument coacting with a plane surface on the support for the connecting-rod;

Figure 2 is a side view of the parts shown in Figure 1;

Figure 3 is a fragmentary horizontal section on line 3—3 of Figure 2;

Figure 4 is a face view of the alignment gauge;

Figure 5 is a section on line 5—5 of Figure 4; the parts being viewed in the direction indicated by the arrows; and Figures 6, 7, 8 and 9 illustrate fragmentarily the employment of the gauge in different positions or relations.

The gauge member comprises a longer wall 21 (Figure 4) and a shorter wall 22 parallel therewith and spaced away therefrom some little distance, the wall 21 on one edge having a cavity or V-shaped recess 23 with side surfaces 24, 24 at right angles to one another, the bottom of such recess having a supplemental depression 25 where otherwise the two converging surfaces 24, 24 would meet, the companion wall 22 having an aligned or registered V-shaped recess 26 with right-angle surfaces 27, 27 and a similar central depression 28.

As is clearly shown and as has been stated above, the two cavities or seats 23 and 26 are in exact alignment and the two walls 21 and 22 are connected together and held in fixed or unchanging relation to one another by a connecting web 29 of angle-cross-section which is out of alignment with or out of the plane of the cavities sufficiently so as not to interfere with the engine connecting-rod during the testing of its wrist-pin, as hereinafer described.

The side face of the wall 21 is at right angles to the seat or socket 23 and at its opposite ends is provided with two, smooth surfaces 31 and 32 in the same plane and at exactly right angles to the axis of the two seats or saddles 23 and 26.

Assuming that it is desired to test the piston or wrist pin 41 of an internal-combustion engine connecting-rod 33, the bearing 34 at the lower end of such rod, that is the bearing, when in the motor, which receives the engine crank shaft, is temporarily mounted on an outstanding, or forwardly-projecting stationary, stud shaft 35 on a bracket 36 or other suitable support having three, vertical, parallel, plain surfaces 37, 38 and 39 on its outer face, that is the face of the bracket from which the shaft projects forwardly at right angles and all in the same vertical plane at precisely right-angles to the axis of shaft 35.

Assuming that it is required first to test the wrist pin as to whether or not it is exactly at right angles to the plane of the connecting-rod in the direction of the length of the rod, then the gauge is applied to the right hand side of the wrist pin as shown in Figures 1 and 6 with the pin in and bearing on the right angle surfaces of the registering seats or saddles 23 and 26, and with the test surfaces 31 and 32 on the intermediate or middle plane face 38.

If both faces 31 and 32 bear simultaneously and fully on the surface 38 under these conditions, then the wrist pin is at exactly right-angles to the plane of the connecting-rod in the direction specified, provided the gauge itself is absolutely accurate.

To test this, the gauge is swung around on the wrist-pin 180 degrees into the position shown in Figure 7, and if the test surfaces 31 and 32 now both bear simultaneously and fully on the plane face 38, this shows that the gauge is correct and accurate, because such reversal retests the wrist pin with the gauge so to speak up side down and applied to the other or opposite side of the wrist pin.

In both of these positions the cross-bar or connecting-web 29 does not interfere with or contact with the connecting-rod and the two saddles or sockets bear on the wrist pin on opposite sides of the connection of the connecting-rod bearing therewith.

Now if we wish to test the wrist pin to determine whether it is at exactly right angles to the plane of the connecting-rod in a direction at right angles to the length of the rod, then the gauge is applied to the top of the pin as shown in Figure 8 and the two faces 31 and 32 coact with the surfaces 37 and 39 which are in the same vertical plane at exactly right angles to the axis of shaft 35.

If this use of the gauge shows the wrist pin to be in correct position, the gauge can be tested as to accuracy and precision by swinging it around 180 degrees so that it bears on the lower portion of the wrist pin as indicated in Figure 9, that is to say, the gauge is reversed so that the two surfaces 31 and 32 now cooperate with the opposite surfaces 37 and 39.

If they bear fully on such surfaces at the same time, as they did when the gauge was applied as shown in Figure 8, then the gauge itself is correct and the wrist pin is at precisely right angles to the direction specified.

If the gauge, when reversed in either one of the positions of Figures 7 and 9, indicates a difference in relation to the surfaces 31 and 32 over that indicated when the gauge is in the positions of Figures 6 or 8, this demonstrates that the gauge itself is out of true either through slight warping or wear or abuse, whereupon, of course, the gauge can be reground to bring it back to absolute accuracy or correctness.

It will be observed that since the gauge is so made that it may be reversed as specified, the operator by such reversal not only tests the gauge itself but also checks or verifies his first observation.

The invention is not confined and limited to the precise and exact embodiments presented but is capable of incorporation in physical form in a number of ways and the invention accordingly is of a scope commensurate with the breadth of the appended claim defining it.

I claim:

An alignment gauge having two walls spaced apart and provided with registering V-shaped recesses adapted to receive the body to be tested, said gauge having a connecting web joining said walls out of the plane bisecting said recesses to avoid interference with bodies associated with said recesses, the side of one of said walls having a test surface exactly at right angles to a line joining the apexes of said recesses.

In witness whereof I have hereunto set my hand and seal.

IRA A. WEAVER. [L. S.]